Jan. 16, 1962     E. R. ZIEGLER     3,016,753

WINDSHIELD WIPER DRIVE MECHANISM

Filed Nov. 10, 1958     3 Sheets-Sheet 1

INVENTOR.
EUGENE R. ZIEGLER
BY
HIS ATTORNEY

Jan. 16, 1962     E. R. ZIEGLER     3,016,753
WINDSHIELD WIPER DRIVE MECHANISM
Filed Nov. 10, 1958     3 Sheets-Sheet 2
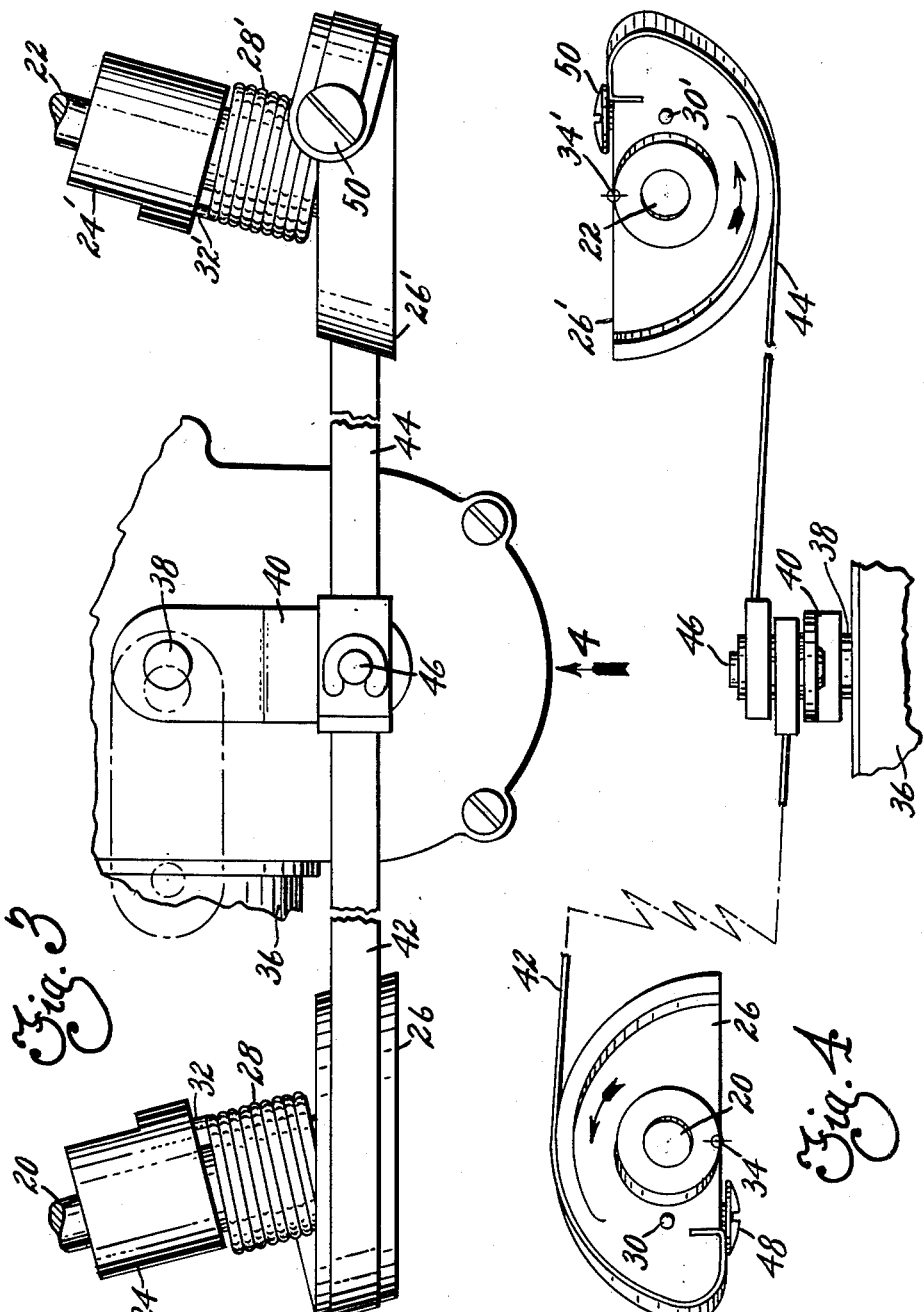
INVENTOR.
EUGENE R. ZIEGLER
BY
*W. E. Fincher*
HIS ATTORNEY

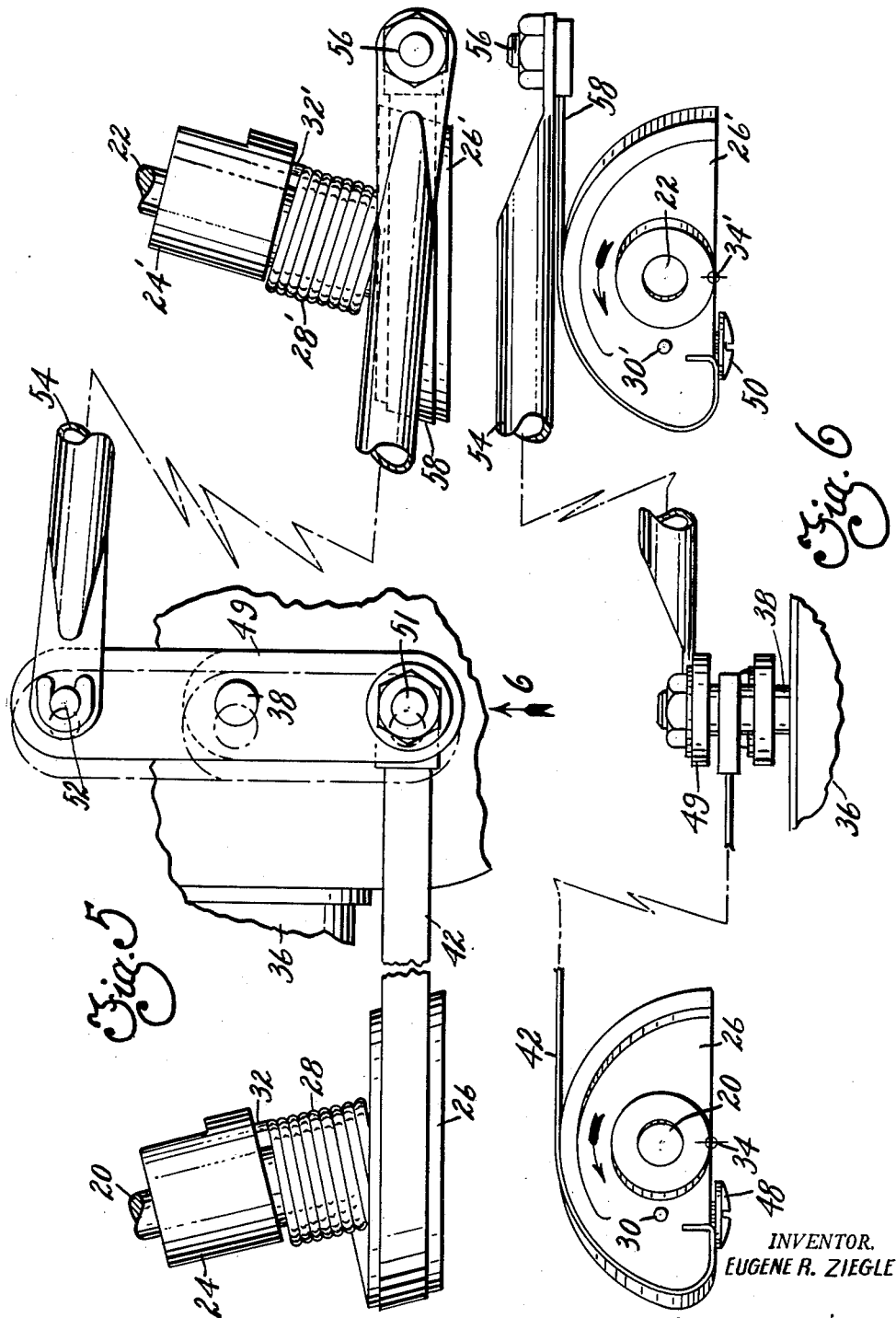

United States Patent Office 3,016,753
Patented Jan. 16, 1962

3,016,753
WINDSHIELD WIPER DRIVE MECHANISM
Eugene R. Ziegler, Spencerport, N.Y., assignor to General Motors Corporation, Detroit, Mich., a corporation of Delaware
Filed Nov. 10, 1958, Ser. No. 772,388
3 Claims. (Cl. 74—95)

This invention pertains to the art of windshield cleaning, and particularly to an improved drive mechanism for windshield wipers.

In my prior application Serial No. 726,931, filed April 7, 1958, and now Patent No. 2,947,185, a linkage drive for windshield wipers is disclosed wherein the angular velocity at the stroke ends of the wiper transmission shafts is automatically reduced to prevent overtravel. The present invention relates to a simplified drive mechanism of the aforesaid type which is adaptable to either a single or a double rotating crank driving member. Accordingly, among my objects are the provision of a linkage drive for converting rotation to oscillation including eccentric means for automatically reducing the angular velocity of a wiper transmission shaft adjacent the stroke ends thereof; the further provision of a wiper drive linkage including a flexible metal strip which is maintained under tension at all times; and the still further provision of a windshield wiper transmission assembly including a shaft, an eccentric, and torsion spring means for biasing the shaft in one direction.

The aforementioned and other objects are accomplished in the present invention by attaching an eccentric to a wiper shaft and biasing the eccentric and shaft assembly in one direction by means of a torsion spring. Specifically, two embodiments of an improved wiper drive linkage are disclosed herein, both embodiments being driven by rotary crank means. During normal running operation the crank means rotates about a fixed axis, and to obtain depressed parking the axis of the crank means can be shifted to vary the throw thereof. The mechanism for shifting the axis of the crank means may be of the type disclosed in copending application Serial No. 718,789 filed March 3, 1958, and now Patent No. 2,985,024, in the name of Contant et al. and assigned to the assignee of this invention.

In one embodiment, a single rotating crank is employed in combination with a pair of flexible metal strips. The inner ends of the strips are rotatably connected to the crank arm, and in order to obtain asymmetrical oscillation of the spaced wiper transmission shafts, one of the strips extends above the transmission shaft and the other strip extends below the transmission shaft. Each transmission shaft is rotatably journalled in a housing, or bracket, fixedly secured to the vehicle. An eccentric drum member is fixedly secured to the inner end of each transmission shaft, the axis of each shaft being disposed between the periphery of the eccentric and the center thereof whereby the distance between the axis of the wiper shaft and the periphery of the eccentric, or the moment arm, is shortest at the center of the wiping stroke and is longest at the stroke ends. Each transmission assembly also includes a torsion spring mounted coaxially with the transmission shaft, one end of which engages the mounting bracket, and the other end of which engages the eccentric for biasing its respective eccentric and transmission shaft towards one stroke end position. Accordingly, the flexible metal strips are maintained under tension at all times, and upon rotation of the single crank arm oscillation will be imparted to the wiper blades and arms attached to the spaced transmission shafts.

In the second embodiment the crank means comprises a double crank, and accordingly, the linkage drive from the double crank means to the transmission can be located beneath the pivot shafts. In this embodiment the linkage drive to one transmission comprises a flexible metal strip, while the drive to the other transmission comprises a rigid link and a flexible strip interconnecting the outer end of the rigid link and the eccentric of the other transmission. In both embodiments the torsion spring torques balance out each other at the rotating drive crank means since they tend to rotate the drive crank means in opposite directions.

Further objects and advantages of the present invention will be apparent from the following description, reference being had to the accompanying drawings, wherein preferred embodiments of the present invention are clearly shown.

In the drawings:

FIGURE 3 is a fragmentary top view illustrating a linkage drive constructed according to one embodiment of this invention.

FIGURE 4 is a view taken in the direction of arrow 4 of FIGURE 3.

FIGURE 5 is a fragmentary top view of a wiper drive linkage constructed according to the second embodiment of this invention.

FIGURE 6 is a fragmentary view taken in the direction of arrow 6 of FIGURE 5.

Figure 1:
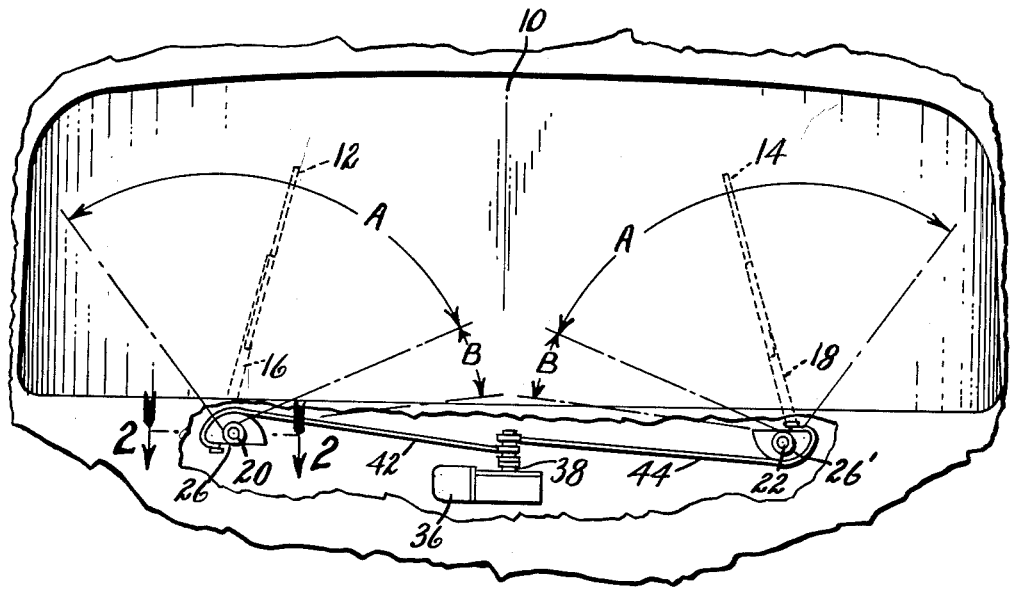
FIGURE 1 is a fragmentary view, in elevation, of a motor vehicle with certain parts broken away, equipped with the windshield wiper drive mechanism of this invention.

With reference to FIGURE 1, a portion of a vehicle is shown illustrating a windshield 10, the outer surface of which is adapted to be cleaned by a pair of wiper blades 12 and 14 carried by oscillatory arms 16 and 18 which are drivingly connected with spaced transmission, or pivot shafts, 20 and 22, respectively. The wiper blades 12 and 14 are oscillated asymmetrically throughout wiping strokes A and can be moved to a depressed parked position throughout the angle B.

Figure 2:
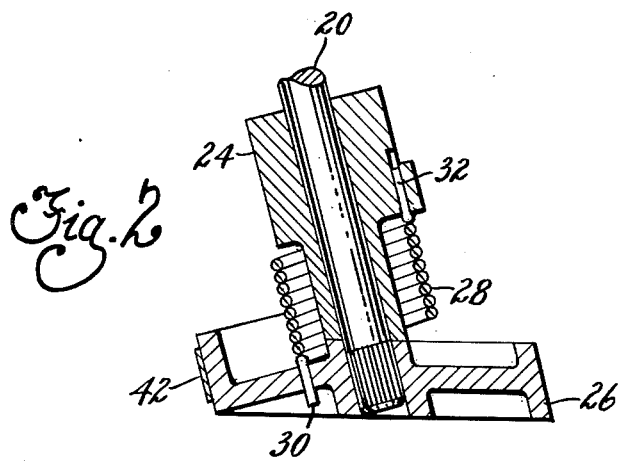
FIGURE 2 is an enlarged fragmentary sectional view of the improved windshield wiper transmission assembly taken along line 2—2 of FIGURE 1.

With reference to FIGURE 2, each of the transmission shafts 20 and 22 are rotatably journalled in a bearing bracket 24 rigidly attached to the vehicle, by any suitable means, not shown. Since the transmission assemblies are identical, only one will be described in detail, like parts of the other being indicated by like numerals with primes affixed. An eccentric drum member 26 is rigidly attached to the inner end of the pivot shaft, and the pivot shaft is encircled by a torsion spring 28. One end 30 of the torsion spring is connected to its respective eccentric, and the other end 32 of the torsion spring is attached to its bearing bracket. The torsion springs are wound so that they normally bias the wiper arms and blades towards opposite stroke end positions.

With reference to FIGURES 3 and 4, in the first embodiment, the eccentrics 26 and 26' for the driver's and passenger's sides of the vehicle have arcuate peripheries, the centers of which are indicated by numerals 34 and 34', respectively. Accordingly, it is apparent that the axes of the pivot shafts 20 and 22 are disposed between the periphery of the eccentrics and the centers thereof. In the embodiment of FIGURES 1 through 4, the wiper arms and blades are driven from a suitably rotary motor 36 having a vertically disposed rotary output shaft 38. The output shaft 38 has a single crank arm 40 extending therefrom, and the axis of the shaft 38 can be shifted from the full to the dotted line position as shown in FIGURE 3 to achieve depressed parking.

Since in the embodiment of FIGURES 1 and 4 the rotary driving motor has only a single crank arm, in order to obtain asymmetrical oscillation of the spaced wiper arms and blades, the eccentric 26′ connected to the pivot shaft on the passenger's side of the vehicle is inverted with respect to the eccentric 26 on the driver's side of the vehicle. A pair of flexible steel strips 42 and 44 having their inner ends rotatably connected to the crank arm 40, or more particularly to the crank pin 46 adjacent the outer end of the crank arm 40, and their outer ends connected by means of fasteners 48 and 50 to the eccentrics 26 and 26′, are utilized to convert rotation of the crank 40 to oscillation of the pivot shafts 20 and 22. As aforementioned, the torsion springs 28 and 28′ inherently bias the pivot shafts 20 and 22 towards opposite stroke end positions. In other words, the torsion springs tend to rotate their respective eccentrics in the counterclockwise direction as viewed in FIGURE 4, whereby the flexible steel strips 42 and 44 will be maintained under tension at all times. Due to the fact that the torsion spring loads oppose each other in tending to rotate the crank 40 in opposite directions, the spring torques balance out each other. Accordingly, during rotation of the crank 40, the flexible metal strips 42 and 44 will alternately be placed under tension by rotation of the crank and by their respective torsion springs. Moreover, due to the fact that the moment arms of the eccentrics increase adjacent the stroke ends of the wiper blades, the angular velocity of the pivot shafts, and hence the wiper arms and blades adjacent the stroke end will be a minimum whereas the angular velocity will be a maximum substantially midway therebetween.

With reference to FIGURES 5 and 6, in the second embodiment the wiper motor driven shaft 38 has a double crank arm 49 attached thereto, each end of which carries a crank pin 51 and 52, respectively. The crank pin 51 is connected with the driver's wiper transmission including eccentric 26 and flexible steel band 42. Since in the embodiment of FIGURES 5 and 6 a double crank arm 49 is employed, the eccentrics associated with the pivot shafts on the driver's and passenger's sides of the vehicle can have the same relationship. However, in order to actuate the passenger's transmission, a rigid link, in the form of a tube 54, is rotatably connected at one end to the crank pin 52 and is rigidly connected by means of a fastener 56 to the end of a flexible steel strip 58 adjacent the eccentric 26′. The other end of the flexible steel strip 58 is attached to the eccentric 26′ by a fastener 50.

In the embodiment of FIGURES 5 and 6, the torsion spring 28 biases the pivot shaft 20 towards the outboard stroke end whereas the torsion spring 28′ biases the pivot shaft 22 towards the inboard stroke end. Accordingly, the spring torques balance out each other, since the torsion spring 28′ exerts a compression load on the rigid link 54 and the torsion spring 28 exerts a tension load on the flexible metal strip 42. However, since the crank arm 49 is double ended the torque of spring 28′ tends to rotate crank arm 49 in the counterclockwise direction whereas the torque of spring 28 tends to rotate the crank arm 49 in the clockwise direction. Therefore, upon rotation of the shaft 38 and the crank arm 49, asymmetrical oscillation will be imparted to the spaced wiper shafts and blades and carried thereby, and the flexible metal strips will be maintained under tension at all times.

While the embodiments of the invention as herein disclosed constitute preferred forms, it is to be understood that other forms might be adopted.

What is claimed is as follows:

1. A windshield wiper drive including in combination, unidirectional rotary crank means, a pair of spaced pivot shafts rotatably supported by spaced brackets, an eccentric drum member attached to each pivot shaft having an arcuate peripheral surface, the axis of each shaft being disposed between the arcuate peripheral surface and the center thereof whereby the angular velocity of each shaft will be a maximum at its mid-stroke position and a minimum at its stroke end position, a torsion spring operatively associated with each pivot shaft, said torsion springs biasing said pivot shafts in the same rotary direction, and means operatively interconnecting said crank means and said drum members so as to effect angular movement of said pivot shafts in opposite directions during rotation of said crank means, said means including a pair of flexible strips, each flexible strip having one end operatively connected with said crank means and its other end secured to one of said drum members such that during each half revolution of said crank means one of said strips is unwound from its drum member and the torsion spring associated with its shaft is stressed, while the other strip is wound on its drum member by the spring associated with its shaft whereby said flexible strips are maintained under tension at all times and the torques created by said torsion springs offset each other.

2. The windshield wiper drives set forth in claim 1 wherein said rotary crank means comprises a single ended crank, and wherein one end of each flexible strip is movably connected to said single ended crank.

3. The windshield wiper drive set forth in claim 1 wherein the rotary crank means comprises a double ended crank, one of said flexible strips being movably connected to one end of said double ended crank and the other of said flexible strips being operatively connected to the other end of said double ended crank through a rigid link.

References Cited in the file of this patent

UNITED STATES PATENTS

| | | |
|---|---|---|
| 328,678 | Hogsett | Oct. 20, 1895 |
| 562,124 | Doolittle | June 16, 1896 |
| 2,172,488 | Waters | Sept. 12, 1939 |
| 2,790,333 | Dyer | Apr. 30, 1957 |
| 2,856,901 | Kvarnstrom et al. | Oct. 21, 1958 |
| 2,901,764 | Anderson | Sept. 1, 1959 |